US006338015B1

(12) United States Patent
Kawagoe et al.

(10) Patent No.: US 6,338,015 B1
(45) Date of Patent: Jan. 8, 2002

(54) STEERING CONTROL SYSTEM FOR VEHICLE

(75) Inventors: Hiroyuki Kawagoe; Shinnosuke Ishida; Tomoaki Teramoto; Kaoru Matsuno, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/151,760

(22) Filed: Sep. 11, 1998

(30) Foreign Application Priority Data

Sep. 13, 1997 (JP) .............................................. 9-268049

(51) Int. Cl.[7] ................................................ B62D 5/04
(52) U.S. Cl. ........................... 701/41; 701/42; 180/131; 180/446; 180/167; 180/169; 250/202; 318/580; 318/587
(58) Field of Search ............................. 701/41, 28, 42; 364/424.02; 180/446, 168, 167, 233, 140, 443, 79.1; 318/580

(56) References Cited

U.S. PATENT DOCUMENTS

| | | | | |
|---|---|---|---|---|
| 4,768,602 A | * | 9/1988 | Inoue et al. ................. 180/140 |
| 5,172,317 A | * | 12/1992 | Asanuma et al. ......... 364/424.02 |
| 5,259,473 A | * | 11/1993 | Nishimoto .................. 180/79.1 |
| 5,475,494 A | * | 12/1995 | Nishida et al. ............ 356/4.01 |
| 5,828,972 A | * | 10/1998 | Asanuma et al. ............. 701/41 |
| 5,913,375 A | * | 6/1999 | Nishikawa .................. 180/168 |
| 5,934,407 A | * | 8/1999 | Shimizu et al. ............. 180/446 |
| 5,996,724 A | * | 12/1999 | Shimizu et al. ............. 180/446 |
| 6,018,691 A | * | 1/2000 | Yamamoto et al. ........... 701/41 |

FOREIGN PATENT DOCUMENTS

| | | |
|---|---|---|
| JP | 5-197423 | 8/1993 |
| JP | 9-221054 | 8/1997 |

* cited by examiner

Primary Examiner—William A. Cuchlinski, Jr.
Assistant Examiner—Tuan C To
(74) Attorney, Agent, or Firm—Arent Fox Kintner Plotkin & Kahn, PLLC (57) ABSTRACT

A system for controlling steering of a vehicle, including a steering means such as a steering wheel with an electric motor which assists steering of the driven wheels of the vehicle, first steering control means for controlling the motor, a CCD camera for detecting a lane condition of a road on which the vehicle travels, a yaw rate sensor for detecting motion of the vehicle, steering assist torque calculating means for calculating a steering assist torque necessary for holding the lane, a torque sensor for detecting an actual steering torque manually applied to the steering means by the driver, and second steering control means for calculating a torque command to be output to the first steering control means based on the steering assist torque calculated by the steering assist torque calculating means and the actual steering torque such that the torque command decreases. In the system, the second steering control means transfers to the first steering control means an index indicative of a condition under which the steering assist torque was calculated, or an index indicative of an order in which the values of the steering assist torque are tansferred, thereby ensuring appropriate and highly reliable communication between the two control means.

23 Claims, 8 Drawing Sheets

SAS ECU → EPS ECU

| | 7 | 6 | 5 | 4 | 3 | 2 | 1 | 0 |
|---|---|---|---|---|---|---|---|---|
| D0 | 0 | ALIVE | | C_TRQ (UPPER) | | | | |
| D1 | 1 | MODE | | C_TRQ (LOWER) | | | | |
| D2 | 1 | Sum | | | | | | |

ALIVE
- BIT 5  0: OPERATES NORMALLY  1: OPERATES ABNORMALLY
- BIT 6  INVERTED EVERY DATA TRANSFER (10 msec)

MODE
- BIT 5  0: EPS MODE  1: SAS MODE
- BIT 6  0: OPERATE NORMALLY  1: COMMUNICATION ERROR OCCURRED

FIG. 8

EPS ECU → SAS ECU

| | 7 | 6 | 5 | 4 | 3 | 2 | 1 | 0 |
|---|---|---|---|---|---|---|---|---|
| D0 | 0 | ALIVE | | M_TRQ (UPPER) | | | | |
| D1 | 1 | MODE | | M_TRQ (LOWER) | | | | |
| D2 | 1 | Sum | | | | | | |

ALIVE
BIT5  0: OPERATES NORMALLY  1: OPERATES ABNORMALLY
BIT6  INVERTED EVERY DATA TRANSFER (10 msec)

MODE
BIT5  0: EPS MODE  1: SAS MODE
BIT6  0: OPERATE NORMALLY  1: COMMUNICATION ERROR OCCURRED

STEERING CONTROL SYSTEM FOR VEHICLE

BACKGROUND OF THE INVENTION

1. Field of the Invention

This invention relates to a steering control system for a vehicle.

2. Description of the Related Art

Earlier patent applications proposed by the assignee, including those made public by Japanese Laid-Open Patent Application Nos. Hei 5(1993)-197,423 and Hei 9(1997)-221,054, teach vehicle steering control system technologies that provide steering angle assistance for keeping the vehicle on a desired course of travel along a lane of a road.

By providing fine steering assistance while preventing vehicle lane wandering, these technologies greatly reduce the burden on the driver, which tends to increase particularly during long, high-speed driving on an expressway or the like.

In view of the interference or interaction between this type of steering assistance control and driver steering, the control should preferably be effected to provide assistance through torque (steering force) rather than steering angle.

When the vehicle is equipped with both a lane holding steering torque assist control system of such type and a steering torque assist control system of the power steering, hereinafter referred to as the power steering torque assist, an issue arises regarding how to conduct communication between the two systems. Above all, there is a need to ensure high reliability of the communication between the control systems of the steering mechanism.

SUMMARY OF THE INVENTION

An object of this invention is therefore to provide a steering control system for a vehicle that, in a vehicle equipped with two types of steering torque assist control systems, ensures appropriate and highly reliable communication between the two control systems.

In order to achieve this object, there is provided a system for controlling steering of a vehicle, including steering means having an actuator which steers driven wheels of the vehicle; first steering control means for controlling the actuator; first detecting means for detecting a lane condition of a road on which the vehicle travels; second detecting means for detecting motion of the vehicle; steering assist torque calculating means for calculating a steering assist torque necessary for holding a positional relationship between the vehicle and the lane condition; torque detecting means for detecting a steering torque manually applied to the steering means by the driver; and second steering control means for calculating a torque command to be output to the first steering control means based on the steering assist torque calculated by the steering torque calculating means and the detected steering torque detected by the torque detecting means such that the torque command decreases. In the system, the second steering control means transfers to the first steering control means an index indicative of a condition under which the steering assist torque was calculated, when the second steering control means transfers the steering assist torque to the first steering control means, thereby ensuring appropriate and highly reliable communication between the two control systems.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
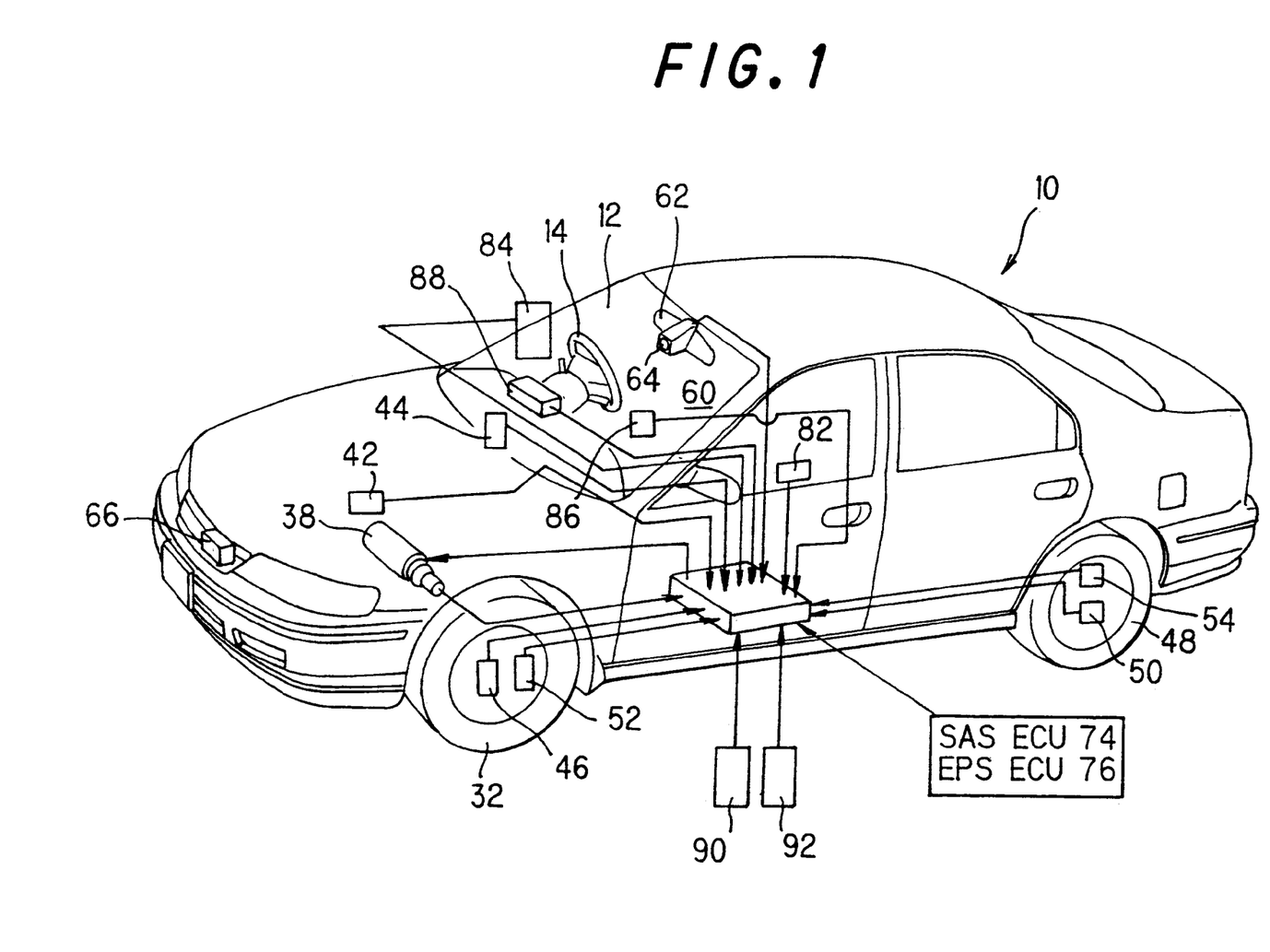
FIG. 1 is a schematic view showing the overall configuration of a vehicle steering control system according to the present invention.
Figure 2:
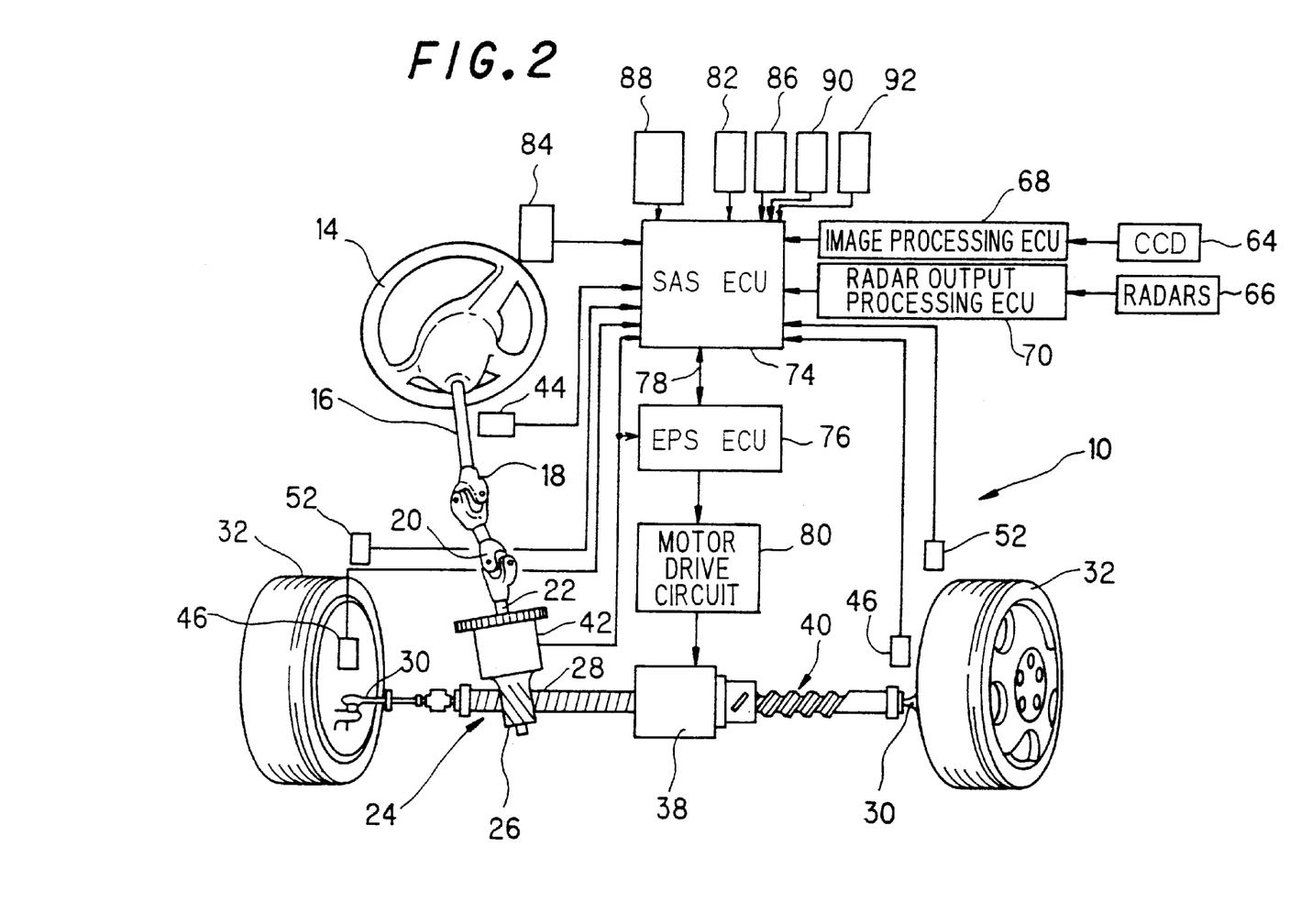
FIG. 2 is an explanatory view showing the configuration of a steering mechanism illustrated in FIG. 1.

FIG. 1 is an overall schematic view of a vehicle steering control system according to the invention. FIG. 2 is an explanatory view of the system with particular focus on the steering mechanism.

As shown in FIGS. 1 and 2, a steering wheel 14 located at the driver's seat 12 of a vehicle 10 is connected to a steering shaft 16 that is in turn connected through universal joints 18, 20 to a connecting shaft 22.

The connecting shaft 22 is connected to a pinion 26 of a rack-and-pinion steering gear assembly 24. The pinion 26 is engaged with a rack 28. Rotary motion input from the steering wheel 14 passes through the pinion 26 to be converted into linear motion of the rack 28. The linear motion passes through tie rods (steering rods) 30, 30 at the opposite ends of the front axle to turn two front wheels (steered wheels) 32, 32 in the desired direction around the associated king pins (not shown).

An electric motor 38 and a ball-screw mechanism 40 are disposed coaxially with the rack 28. The output of the motor 38 is converted into linear motion of the rack 28 by a ball-screw mechanism 40 so as to move the rack 28 in the direction that reduces or assists the steering force (steering torque) input through the steering wheel 14.

A torque sensor 42 provided in the vicinity of the rack-and-pinion steering gear 24 outputs a signal indicating the direction and magnitude of the steering force (steering torque) input by the driver. A steering angle sensor 44 provided in the vicinity of the steering shaft 16 outputs a signal indicating the direction and magnitude of the steering angle input by the driver. The steering angle sensor 44 is a rotary encoder or the like.

Wheel speed sensors 46, 46 provided one in the vicinity of each of the front wheels 32, 32 and wheel speed sensors 50, 50 (FIG. 1; only one shown) provided one in the vicinity of each of two rear wheels 48, 48 (only one shown) output signals once every rotation of the associated front and rear wheels. The wheel speed sensors 46, 46 and 50, 50 are magnetic pick-ups or the like. The front wheels 32, 32 are powered by an engine (not shown) mounted at the front of the vehicle 10. The rear wheels 48, 48 are idle.

A vehicle height sensor 52 is provided in the vicinity of the suspension mechanism (not shown) of each front wheel 32 and a vehicle height sensor 54 is provided in the vicinity of the suspension mechanism (not shown) of each rear wheel 48. Based on the stroke (displacement) of the associated suspension mechanism, each height sensor outputs a signal indicating the height of the vehicle 10 at the sensor location.

As shown in FIG. 1, a single CCD (charge coupled device) camera 64 combined with rear-view mirror 62 is attached to the inner surface of the windshield 60 above the driver's seat 12. Multiple radars 66 (operative in millimeter wave; only one radar shown in FIG. 1) are provided at appropriate locations near the front bumper of the vehicle 10 and emit modulated waves to the front.

The CCD camera 64 is dedicated to imaging the road ahead of the vehicle. As shown in FIG. 2, the image signal output by the CCD camera 64 is forwarded to an image processing ECU (electronic control unit) 68, comprised of a microcomputer, that extracts the lane boundaries (white lines) painted on the road. The outputs of the millimeter wave radars 66 are forwarded to a radar output processing ECU 70, also comprised of a microcomputer, where they are mixed with a received wave obtained through an antenna (not shown) and used to discriminate whether or not a solid object such as another vehicle locates ahead of the vehicle 10.

The vehicle steering control system according to the invention also has an electronic control unit (shown as SAS ECU) 74, also comprised of a microcomputer. The outputs of the image processing ECU 68, the radar output processing ECU 70 and the torque sensor 42 etc. are input to the SAS ECU 74.

The system is also equipped with a second electronic control unit (shown as EPS ECU) 76 comprised of a microcomputer. The EPS ECU 76 computes the power steering torque assist amount. The output of the torque sensor 42 is input to the EPS ECU 76.

The SAS ECU 74 and the EPS ECU 76 can communicate with each other through a signal line 78. The SAS ECU 74 computes the steering torque assist amount as explained later and forwards the computed data to the EPS ECU 76.

The EPS ECU 76 uses the steering torque assist amount data received from the SAS ECU 74 to compute a torque command in duty ratio in terms of PWM (pulse-width modulation) and outputs it to a motor drive circuit 80. The motor drive circuit 80, which is equipped with a bridge circuit (not shown) composed of four power FET switching devices, drives the electric motor 38 in response to the torque command.

A yaw rate sensor 82 (FIG. 1) is installed at a location near the center of gravity of the vehicle 10. The yaw rate sensor 82 outputs a signal indicating the yaw rate (angular velocity of yaw) around the vertical (gravitational) axis at the vehicle center of gravity.

An appropriate number of tactile pressure sensors 84 provided on the steering wheel 14 output pressure signals indicating whether or not the driver is manipulating the steering wheel. An appropriate number of second tactile pressure sensors 86 installed under the driver's seat output signals indicating whether or not the driver is seated.

A navigator 88 provided in the area of the dashboard is equipped with a memory device storing road information (map information) regarding the region where the vehicle 10 travels.

A brake sensor 90 associated with the brake pedal (not shown) near the floor at the driver's seat 12 outputs a signal indicating the amount of depression of the brake pedal by the driver. An accelerator sensor 92 associated with the accelerator pedal (not shown) outputs a signal indicating the amount of depression of the accelerator pedal by the driver.

An overall explanation of the control by the SAS ECU 74 and the EPS ECU 76 will now be given.

Figure 3:
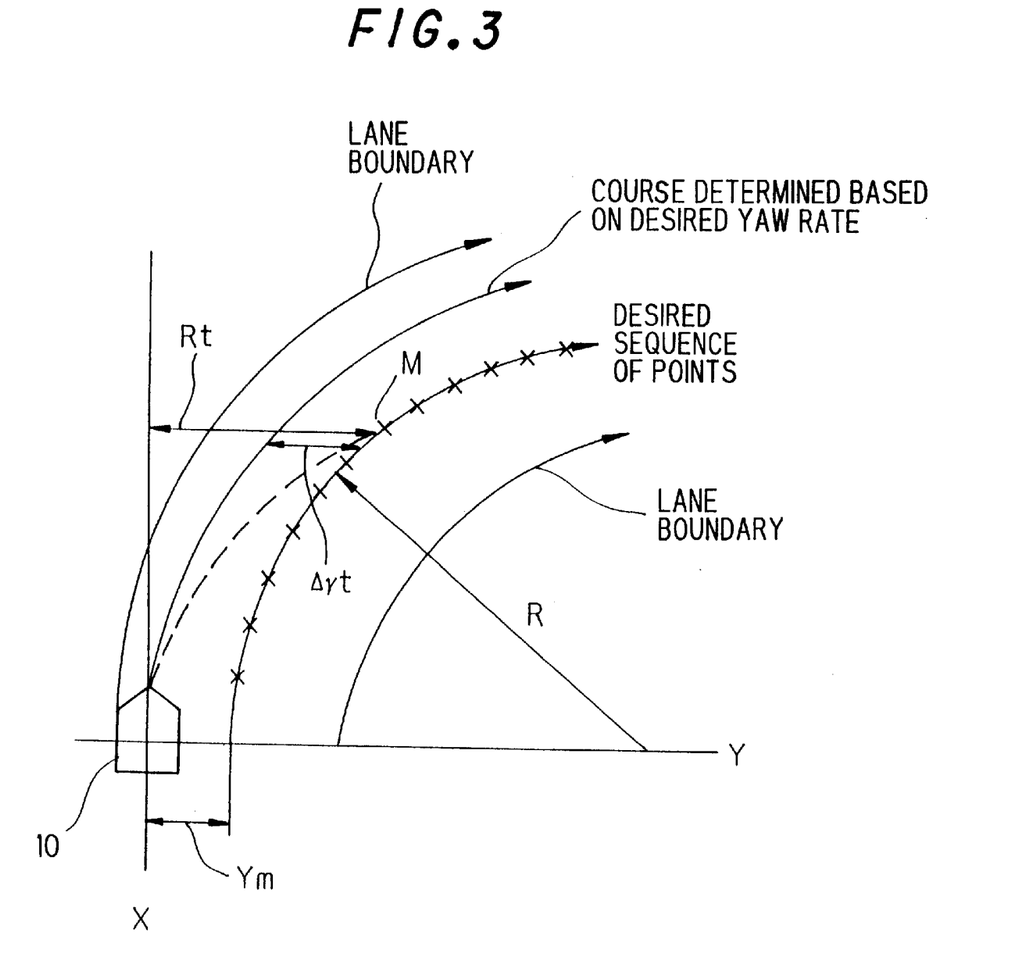
FIG. 3 is an explanatory view showing the operation of an SAS ECU illustrated in FIG. 2.

The SAS ECU 74 computes the lane holding steering assist torque for keeping the vehicle 10 traveling parallel with the lane (lane boundaries). Although this computation is conducted by a separate routine not shown in the drawings, the principle will be briefly explained with reference to FIG. 3. A desired sequence of points is calculated from the lane boundaries obtained by image processing the output of the CCD camera 64 in the image processing ECU 68. A desired yaw rate is calculated from the desired sequence of points.

Figure 4:
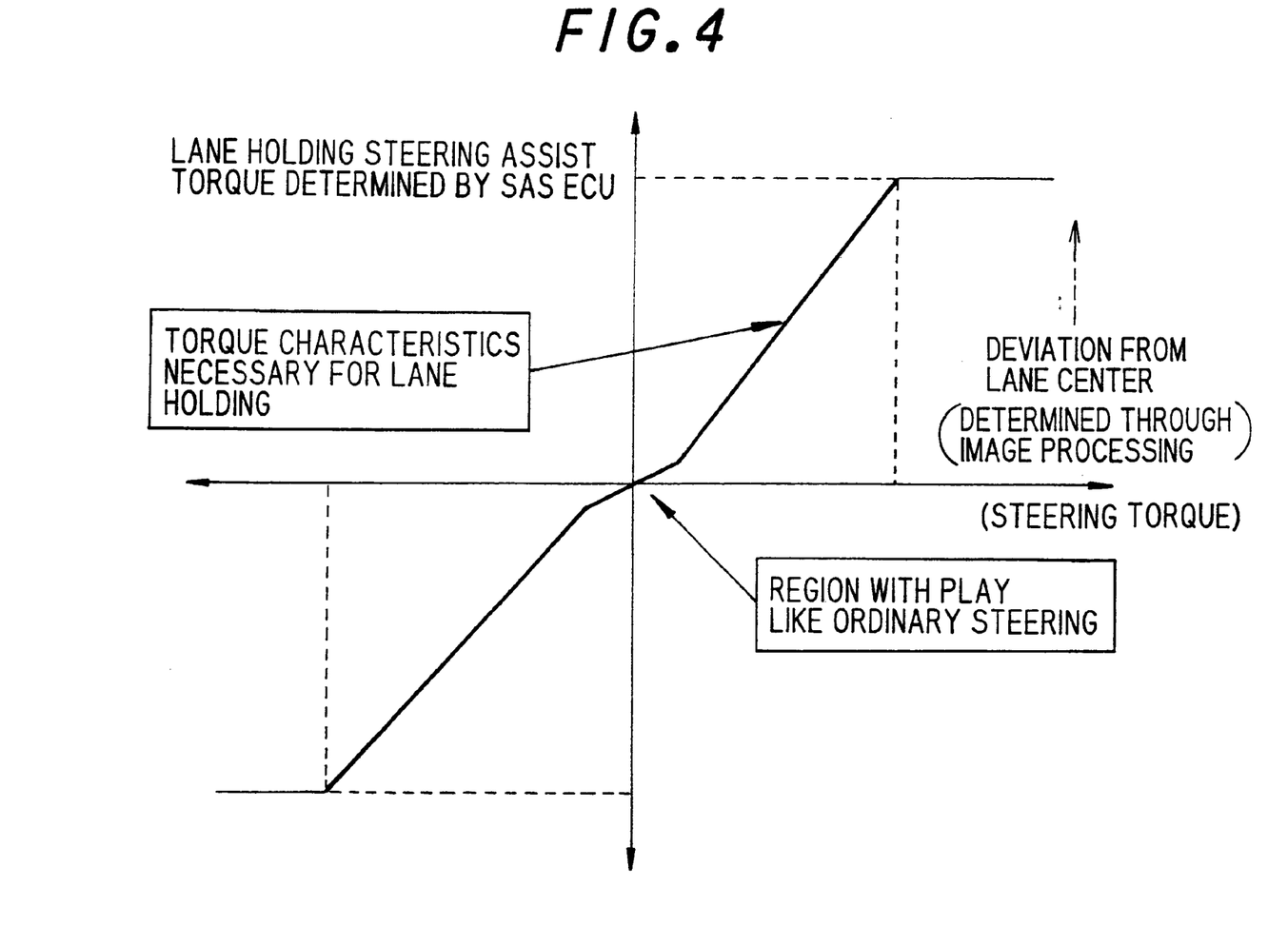
FIG. 4 is a graph showing the characteristics of lane holding steering assist torque determined by the SAS ECU and an EPS ECU illustrated in FIG. 2.
Figure 5:
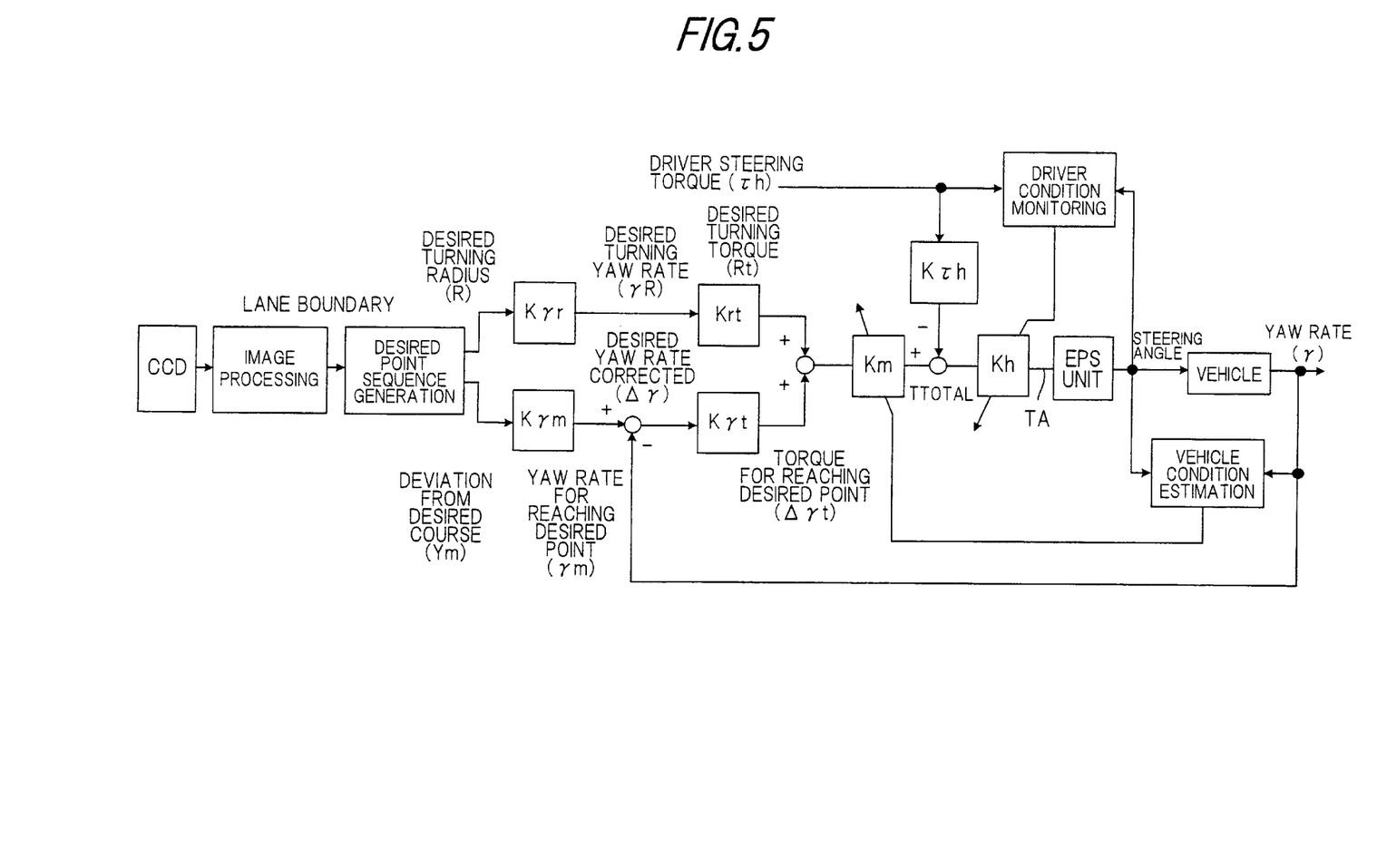
FIG. 5 is a block diagram showing functionally the operation of the SAS ECU illustrated in FIG. 2.

As shown in FIG. 4, a steering assist torque is calculated in accordance with deviation from the lane center and control is effected to achieve a course determined based on the desired yaw rate. FIG. 5 is a block diagram showing this control.

Since this control is described in detail in a Japanese patent application filed by the assignee on the same date, it will not be explained further here.

As indicated parenthetically in FIG. 4, the EPS ECU 76 uses the detected steering torque to compute a power steering assist torque. The basic steering assistance control of this system is that by the SAS ECU 74 for holding the vehicle in the lane and the system switches to the power steering torque assist control by the EPS ECU 76 when the steering torque input by the driver exceeds a prescribed value.

Since the invention relates to communication between the SAS ECU 74 and the EPS ECU 76, this will now be explained.

Available modes of signal exchange between units or control systems include analog, parallel and serial. Accurate communication of data (manipulated variables) by analog signals is difficult, however, owing to reference voltage (ground voltage level) offset between different units.

In the case of important signals related to steering control and other steering operations, therefore, the practice is to transmit both the signal concerned and another signal obtained by inverting the output properties of the signal and to effect differential arithmetic processing on the receiver for eliminating the offset.

Parallel mode signal transmission enables accurate data exchange without need for offset processing but involves use of a large number of signal lines. Since a defect in even a single line causes faulty data transmission, this mode requires higher line reliability than the analog mode.

In contrast, serial mode signal transmission does not require offset processing, involves few signal lines, and can provide a transmission rate adequate in light of the system processing time. It has high utility once a solution is found to providing noise resistance.

In light of these advantages, serial mode signal transmission has been selected for use in this system according to the present invention. The relatively slow transmission rate of this mode is not a problem in this system because it is still fast enough relative to the processing times of the SAS ECU 74 and the EPS ECU 76. Moreover, the issue of noise resistance can be overcome. Another reason for the selection was the desire to give top priority to reliability in communication between steering control systems.

As mentioned earlier, the SAS ECU 74 and the EPS ECU 76 are connected by the signal line 78. The steering assist torque is sent/received in serial mode between the SAS ECU 74, defined as the master unit, and the EPS ECU 76, defined as the slave unit.

The operation of the system will be explained with reference to FIG. 6.

The serial mode format is as follows:

Format: Half duplex/start-stop synchronization (asynchronous)

| Data bits  | 8 bits    |
|------------|-----------|
| Baud rate  | 9,600 bps |
| Parity     | Even      |
| Stop bits  | 1         |

Figure 6:
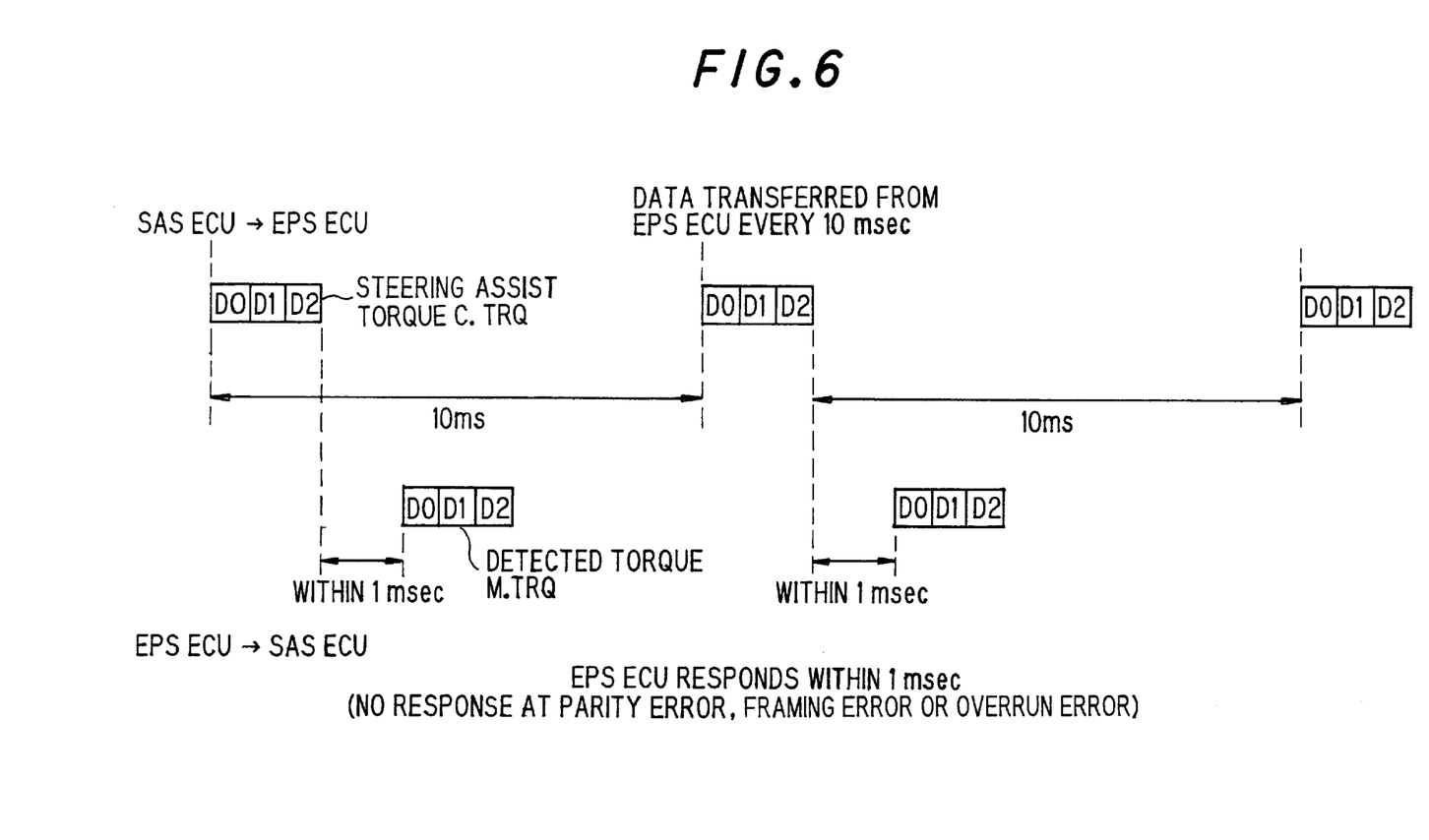
FIG. 6 is an explanatory view showing a serial mode signal transmission conducted between the SAS ECU and the EPS ECU illustrated in FIG. 1.

As shown in FIG. 6, the SAS ECU 74 (master) transfers the steering assist torque which is added to the power steering assist torque to obtain a torque command TA (shown in FIG. 5). The steering assist torque computed by the SAS ECU 74, hereinafter referred to more specifically as C_TRQ, is sent to the EPS ECU 76 (slave) once every 10 msec.

The EPS ECU 76 responds by transferring to the SAS ECU 74 the detected steering torque (τh, shown in FIG. 5, detected value by the torque sensor 42 and is hereinafter referred to more specifically as detected torque M_TRQ) within 1 msec.

Figure 7:
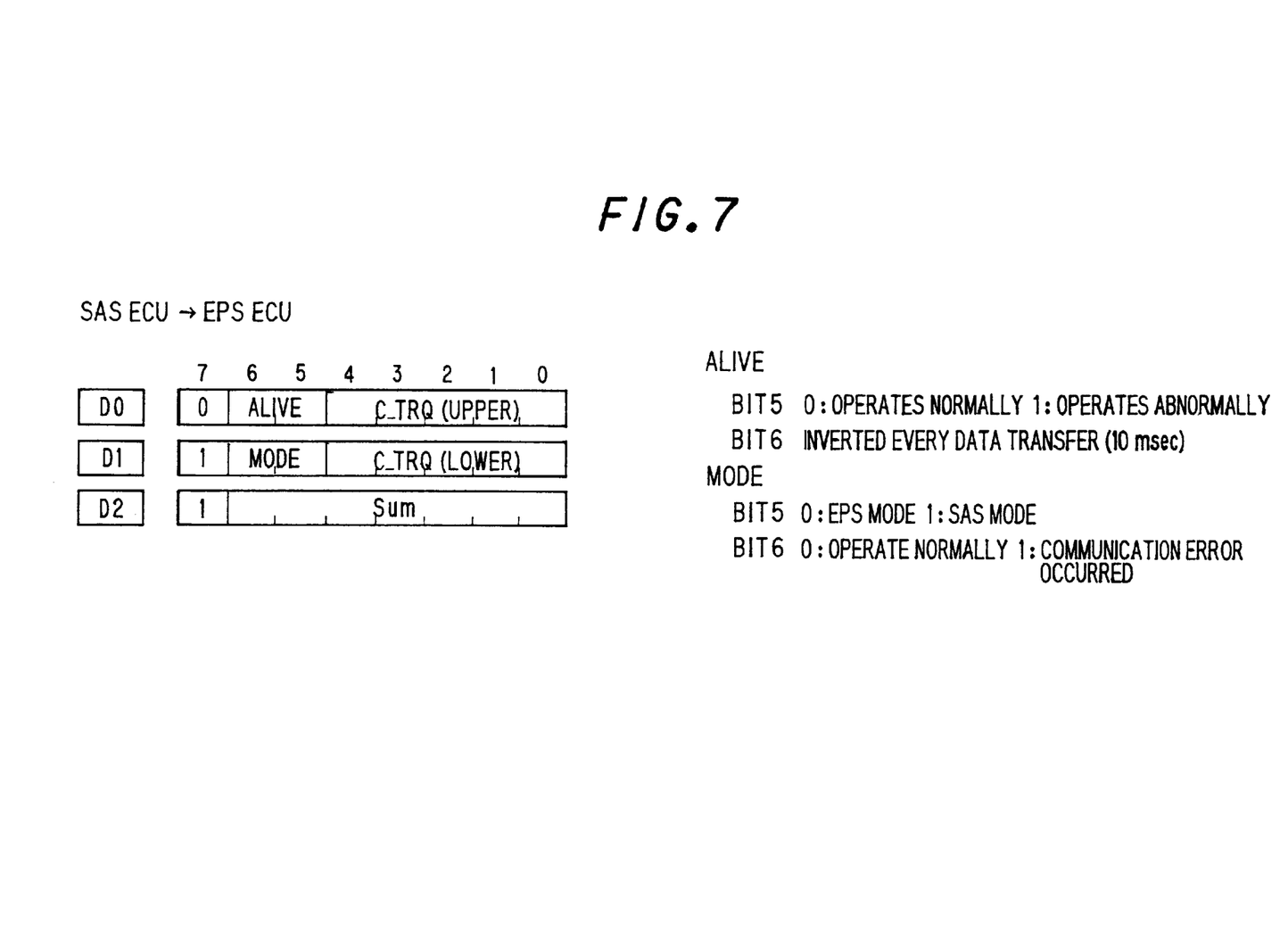
FIG. 7 is an explanatory view showing the buffer formats of the data transferred from the SAS ECU to the EPS ECU illustrated in FIG. 6.

Each data set D0, D1 and D2 shown at the top of FIG. 6, transferred from the SAS ECU 74 to the EPS ECU 76, is formatted as an 8-bit frame. FIG. 7 is a diagram for explaining the buffer formats of the data sets.

In FIG. 7, among the data bits of D0, the upper five bits of the steering assist torque C_TRQ are stored at or assigned the 0 to 4th bits starting from the least significant bit (LSB). The steering assist torque C_TRQ is comprised of 10 bits, upper five bits of which are stored in D0.

A signal or index (ALIVE BIT5) indicating the condition of the image processing ECU 68 is stored at the 5th bit. A signal or index (ALIVE BIT6) indicating the order in which the values of the steering assist torque are transferred, is stored at the 6th bit. A flag 0 indicating that the data bit set is D0 is stored at the 7th bit.

In the data bit set D1, the ALIVE signals are thus constituted by the 5th and 6th bits. The 5th bit ALIVE signal indicates whether or not the image processing ECU 68 is functioning normally, i.e., whether the steering assist torque was determined from the result of image processing conducted under normal conditions. When the image processing ECU 68 is functioning normally, "0" (normal) is sent. When it is not, e.g., when the steering assist torque was calculated based on image processing conducted under inappropriate conditions such as imaging into the sun, "1" (abnormal) is sent.

The 6th bit (ALIVE BIT6) is inverted with each output in the manner of a watchdog pulse (WDP) to confirm normal operation of the SAS ECU 74. Specifically, if "0" was stored as the 6th bit and sent to the EPS ECU 76 in the preceding data transfer, the inverted value thereof, i.e., "1," is stored and sent in the current data transfer.

When the EPS ECU 76 finds that current bit is not inverted relative to the bit received in the preceding cycle, it determines that the data was not normally transferred. In other words, if the EPS ECU 76 received "0" as the ALIVE BIT6 in the preceding cycle, it expects to receive "1" as the ALIVE BIT6 in the current cycle. If it actually receives "1," it determines that the received data bit set is the most recent, i.e., that the SAS ECU 74 (transmitter) is operating normally. If it receives "0," it determines the SAS ECU 74 is not operating normally.

Among the data bits of D1, the lower five bits of the steering assist torque C_TRQ are stored at the 0 to 4th bits. At the 5th bit is stored a mode signal (MODE BIT5) indicating whether the current control mode is EPS mode (power steering control mode by the EPS ECU 76) or SAS mode (lane holding control mode by the SAS ECU 74).

A signal or index (MODE BIT6) indicating the condition of the communication system is stored at the 6th bit, and a flag (bit set to 1) is stored at the 7th bit.

Thus, the mode signals are constituted by the 5th bit and 6th bit of the data bit set D1 and the 5th bit indicates which of the SAS mode and the EPS mode is in effect (0: EPS, 1: SAS). When the detected communication condition is normal, the 6th bit is reset to 0. When it is abnormal or when a communication error (address mismatching, sum check error or the like) occurs, the 6th bit is set to 1. The reset or set bit is then sent.

In the data bit set D2, sum check data designated Sum are stored at the 0 to 6th bits. A flag (bit set to 1) is stored at the 7th bit. The sum check data represent the result of a check as to whether or not all data were transferred completely. When a discrepancy is discovered, it is determined that a sum check error occurred, and the mode signal stored at the 6th bit of D1 is set to "1" and transferred.

The data bit sets D0, D1 and D2 formatted in the foregoing manner are transferred to the EPS ECU 76 regularly at the aforesaid cycle time of 10 msec. Within 1 msec of each data send, the EPS ECU 76 responds by transferring to the SAS ECU 74 data bit sets D0, D1 and D2 representing the detected torque M_TRQ at the time point of the data transfer from the EPS ECU 76.

Figure 8:
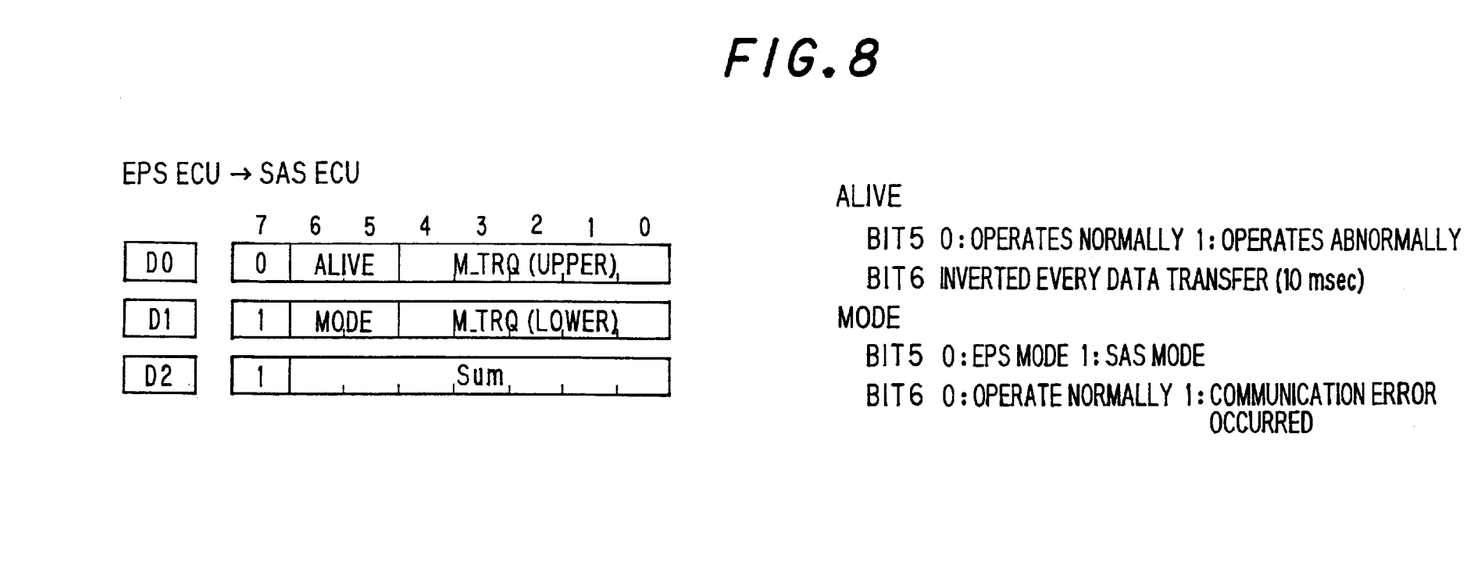
FIG. 8 is a view, similar to FIG. 7, but showing those transferred from the EPS ECU to the SAS ECU illustrated in FIG. 6.

The buffer formats of these data sets are shown in FIG. 8. It should be noted, however, that EPS ECU 76 does not respond when a communication error has occurred in the data bit sets sent from the SAS ECU 74, i.e., when a parity error, framing error (error occurred in the course of data composition), overrun error (error condition making processing impossible owing to inflow of subsequent data before reading of preceding data was completed) or the like has arisen, as shown in FIG. 6.

Among the three data bit sets sent back to the EPS ECU 76, D0 stores the upper five bits of the detected torque M_TRQ at the 0 to 4th bits.

A signal or index (ALIVE BIT5) indicating fail condition of the EPS ECU 76 is stored at the 5th bit, a signal (ALIVE BIT6) indicating the order in which the detected torques were sent is stored at the 6th bit, and a flag (reset to 0) is stored at the 7th bit.

Thus, as in the case of the data bit set D0 sent from the SAS ECU 74 to the EPS ECU 76, that sent from the EPS ECU 76 to the SAS ECU 74 also has ALIVE, signals at the 5th bit and 6th bit.

More specifically, the 5th bit ALIVE signal indicates whether or not the EPS ECU 76, the motor drive circuit 80 and the like are functioning normally. When they are, "0" is sent back and when they are not, "1" is sent back.

The 6th bit, like the 6th bit signal (ALIVE BIT6) of the data bit set sent from the SAS ECU 74, is also inverted at each send. When the SAS ECU 74 (the receiver) finds that current ALIVE BIT6 bit is not inverted relative to the bit received in the preceding cycle, it determines that the received data bit set is not the most recent and that the EPS ECU 76 is not operating normally.

In D1, the remaining lower five bits of the detected torque M_TRQ are stored at the 0 to 4th bits. At the 5th bit is stored a mode signal or index (MODE BIT5) indicating whether the current control mode is the control mode by the EPS ECU 76 or the control mode by the SAS ECU 74. A signal or index indicating the condition of the communication system (normal/communication error) is stored at the 6th bit and a flag (bit set to 1) is stored at the 7th bit.

In the data bit set D2, a sum check Sum is stored at the 0 to 6th bits and a flag (bit set to 1) is stored at the 7th bit.

Thus in this system serial communication is conducted between the SAS ECU 74 and the EPS ECU 76 and the data bit sets sent from the SAS ECU 74 are added with the ALIVE (BIT5, 6) signals.

By this, the EPS ECU 76 on the receiving side can detect inappropriate data bit sets that occur, such as in the case where a received data bit set was generated when the image output by the image processing ECU 68 was in an inappropriate condition and the problem was not caught by a limit check or in the case where a received data bit set is not the most recent data bit set. Therefore, when two types of steering torque assist control are provided, appropriate communication between the two control systems can be provided to ensure high reliability.

In addition, the incorporation of the mode (MODE BIT5, 6) signals enables the SAS ECU 74 to detect the presence of a data bit set after termination of SAS control (such as one remaining in the transfer buffer) and communication system errors (such as a transmitted data bit set involving address mismatching, sum check error or the like).

Moreover, the system is configured so that when the EPS ECU 76 receives the steering assist torque from the SAS ECU 74 it responds within a fixed time period by sending back ALIVE signals in addition to the detected torque at the time the steering assist torque was received. This enables the SAS ECU 74 to detect a data bit set that is not the most recent and also to detect failure of the EPS ECU 76.

Further, since the system is configured to send back an additional signal (MODE BIT6) indicating the condition of the communication system, the SAS ECU 74 can detect failure of the EPS ECU 76.

The embodiment is thus configured to have a system for controlling steering of a vehicle, including steering means (steering wheel 14, steering gear 24) having an actuator (electric motor 38) which steers driven wheels (front wheels 32) of the vehicle; first steering control means (EPS ECU 76) for controlling the actuator; first detecting means (CCD camera 64, image processing ECU 68) for detecting a lane condition of a road on which the vehicle travels; second detecting means (yaw rate sensor 82, etc.) for detecting motion of the vehicle; steering assist torque calculating means (SAS ECU 74) for calculating a steering assist torque (C_TRQ) necessary for holding a positional relationship between the vehicle and the lane condition; torque detecting means (torque sensor 42) for detecting a steering torque (τh, M_TRQ) manually applied to the steering means by the driver; and second steering control means (SAS ECU 74) for calculating a torque command (TA) to be output to the first steering control means (EPS ECU 76) based on the steering assist torque (C_TRQ) calculated by the steering torque calculating means and the detected steering torque (τh, M_TRQ) detected by the torque detecting means such that the torque command (TA) decreases. In the system, the second steering control means (SAS ECU 74) transfers to the first steering control means (EPS ECU 76) an index (ALIVE BIT5) indicative of a condition under which the steering assist torque (C_TRQ) was calculated, when the second steering control means (SAS ECU 74) transfers the steering assist torque (C_TRQ) to the first steering control means (EPS ECU 76), thereby ensuring appropriate and highly reliable communication between the two control systems.

The second steering control means (SAS ECU 74) transfers to the first steering control means (EPS ECU 76) an index (ALIVE BIT6) indicative of an order in which the steering assist torque (C_TRQ) are transferred, when the second steering control means (SAS ECU 74) transfers the steering assist torque (C_TRQ) to the first steering control means (EPS ECU 76), thereby ensuring appropriate and highly reliable communication between the two control systems.

The second steering control means (SAS ECU 74) transfers to the first steering control means (EPS ECU 76) an index (MODE BIT6) indicative of a condition of a communication system, thereby enabling the first steering control means to detect the communication system condition and further ensuring appropriate and highly reliable communication between the two control systems.

The first steering control means (EPS ECU 76) transfers to the second steering control means (SAS ECU 74) the detected steering torque (M_TRQ) in response to the transferred steering assist torque (C_TRQ), thereby enabling the second steering control means to detect the operating condition of the first steering control means and further ensuring appropriate and highly reliable communication between the two control systems.

The first steering control means (EPS ECU 76) transfers to the second steering control means (SAS ECU 74) an index (ALIVE BIT6) indicative of an order in which the detected torques (M_TRQ) are transferred in response to the transferred steering assist torque (C_TRQ), thereby enabling the second steering control means to detect the operating condition of the first steering control means and further ensuring appropriate and highly reliable communication between the two control systems.

The first steering control means (EPS ECU 76) transfers to the second steering control means (SAS ECU 74) an index (ALIVE BIT5) indicative of a fail condition of the first steering control system (EPS ECU 76), thereby enabling the second steering control means to detect the operating condition of the first steering control means and further ensuring appropriate and highly reliable communication between the two control systems.

The first steering control means (EPS ECU 76) transfers to the second steering control means (SAS ECU 76) an index (MODE BIT6) indicative of a condition of the communication system, thereby enabling the second steering control means to detect the operating condition of the first steering control means and further ensuring appropriate and highly reliable communication between the two control systems.

Although an embodiment was explained in which the steering assist mechanism doubles as a conventional power steering mechanism, the two mechanisms can instead be provided independently. The steering assist mechanism can be hydraulically powered instead of being electrically powered as in the foregoing embodiment.

The steering angle sensor 44 and other sensors can be differently configured from what was described in the foregoing and their locations are limited only by the need to provide the required values.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling steering of a vehicle, comprising:
    steering means having an actuator which steers driven wheels of the vehicle;
    first steering control means for controlling the actuator;
    first detecting means comprising a camera that images a road ahead of the vehicle for detecting a lane boundary condition of the road on which the vehicle travels;
    second detecting means for detecting motion of the vehicle;
    steering assist torque calculating means for calculating a steering assist torque necessary for holding a positional relationship between the vehicle and the lane condition;
    torque detecting means for detecting a steering torque manually applied to the steering means by the driver; and
    second steering control means for calculating a torque command to be output to the first steering control means based on the steering assist torque calculated by the steering assist torque calculating means and the detected steering torque detected by the torque detecting means to control the actuator such that the torque command decreases;
    wherein:
        the second steering control means transfers to the first steering control means an index indicative of a condition under which the steering assist torque was calculated, when the second steering control means transfers the steering assist torque to the first steering control means.

2. A system according to claim 1, wherein the second steering control means transfers to the first steering control means an index indicative of an order in which the steering assist torque are transferred, when the second steering control means transfers the steering assist torque to the first steering control means.

3. A system according to claim 1, wherein the second steering control means transfers to the first steering control means an index indicative of a condition of a communication system.

4. A system according to claim 1, wherein the second steering control means transfers to the first steering control means an index indicating which of control by the first steering control means and control by the second steering control means is in effect.

5. A system according to claim 1, wherein the first steering control means transfers to the second steering control means the detected steering torque in response to the transferred steering assist torque.

6. A system according to claim 2, wherein the first steering control means transfers to the second steering control means the detected steering torque in response to the transferred steering assist torque.

7. A system according to claim 1, wherein the first steering control means transfers to the second steering control means an index indicative of an order in which the detected torques are transferred in response to the transferred steering assist torque.

8. A system according to claim 2, wherein the first steering control means transfers to the second steering control means an index indicative of an order in which the detected torques are transferred in response to the transferred steering assist torque.

9. A system according to claim 1, wherein the first steering control means transfers to the second steering control means an index indicative of a fail condition of the first steering control system.

10. A system according to claim 1, wherein the first steering control means transfers to the second steering control means an index indicative of a condition of the communication system.

11. A system according to claim 1, wherein the first steering control means transfers to the second steering control means an index indicating which of control by the first steering control means and control by the second steering control means is in effect.

12. A method of controlling steering of a vehicle, having:
    steering means having an actuator which steers driven wheels of the vehicle;
    first steering control means for controlling the actuator;
    first detecting means comprising a camera that images a road ahead of the vehicle for detecting a lane boundary condition of the road on which the vehicle travels;
    second detecting means for detecting motion of the vehicle;
    steering assist torque calculating means for calculating a steering assist torque necessary for holding a positional relationship between the vehicle and the lane condition;
    torque detecting means for detecting a steering torque manually applied to the steering means by the driver; and
    second steering control means for calculating a torque command to be output to the first steering control means based on the steering assist torque calculated by the steering assist torque calculating means and the detected steering torque detected by the torque detecting means to control the actuator such that the torque command decreases;
    wherein said method comprises the step of:
        transferring to the first steering control means an index indicative of a condition under which the steering assist torque was calculated, when the second steering control means transfers the steering assist torque to the first steering control means.

13. A method according to claim 12, wherein transferring to the first steering control means an index indicative of an order in which the steering assist torque are transferred, when the second steering control means transfers the steering assist torque to the first steering control means.

14. A method according to claim 12, wherein transferring to the first steering control means an index indicative of a condition of a communication system.

15. A method according to claim 12, wherein transferring to the first steering control means an index indicating which of control by the first steering control means and control by the second steering control means is in effect.

16. A method according to claim 12, wherein transferring to the second steering control means the detected steering torque in response to the transferred steering assist torque.

17. A method according to claim 13, wherein transferring to the second steering control means the detected steering torque in response to the transferred steering assist torque.

18. A method according to claim 13, wherein transferring to the second steering control means an index indicative of an order in which the detected torques are transferred in response to the transferred steering assist torque.

19. A method according to claim 13, wherein transferring to the second steering control means an index indicative of an order in which the detected torques are transferred in response to the transferred steering assist torque.

20. A method according to claim 12, wherein transferring to the second steering control means an index indicative of a fail condition of the first steering control system.

21. A method according to claim 12, wherein transferring to the second steering control means an index indicative of a condition of the communication system.

22. A method according to claim 12, wherein transferring to the second steering control means an index indicating which of control by the first steering control means and control by the second steering control means is in effect.

23. A computer program embodied on a computer-readable medium for controlling steering of a vehicle having:

steering means having an actuator which steers driven wheels of the vehicle;

first steering control means for controlling the actuator;

first detecting means comprising a camera that images a road ahead of the vehicle for detecting a lane boundary condition of the road on which the vehicle travels;

second detecting means for detecting motion of the vehicle;

steering assist torque calculating means for calculating a steering assist torque necessary for holding a positional relationship between the vehicle and the lane condition;

torque detecting means for detecting a steering torque manually applied to the steering means by the driver; and     second steering control means for calculating a torque command to be output to the first steering control means based on the steering assist torque calculated by the steering assist torque calculating means and the detected steering torque detected by the torque detecting means to control the actuator such that the torque command decreases;

wherein said computer program comprising the step of:
        transferring to the first steering control means an index indicative of a condition under which the steering assist torque was calculated, when the second steering control means transfers the steering assist torque to the first steering control means.

* * * * *